(12) United States Patent
Scholte

(10) Patent No.: US 7,107,354 B2
(45) Date of Patent: Sep. 12, 2006

(54) MULTIPLEXER DISCOVERY AND PARAMETER EXCHANGE

(75) Inventor: Alexander Martin Scholte, Chatswood (AU)

(73) Assignee: Avaya Technology Corp., Basking Ridge, NJ (US)

( * ) Notice: Subject to any disclaimer, the term of this patent is extended or adjusted under 35 U.S.C. 154(b) by 646 days.

(21) Appl. No.: 10/359,850

(22) Filed: Feb. 7, 2003

(65) Prior Publication Data

US 2004/0196825 A1 Oct. 7, 2004

(51) Int. Cl.
*G06F 15/173* (2006.01)
(52) U.S. Cl. .................... 709/244; 709/228
(58) Field of Classification Search ........ 709/238–244, 709/227–229; 370/351, 428–429, 401–105
See application file for complete search history.

(56) References Cited

U.S. PATENT DOCUMENTS

| | | | |
|---|---|---|---|
| 6,118,785 A | 9/2000 | Araujo et al. | |
| 6,389,038 B1 | 5/2002 | Goldberg et al. | 370/471 |
| 6,438,137 B1 * | 8/2002 | Turner et al. | 370/466 |
| 6,477,164 B1 | 11/2002 | Vargo et al. | |
| 6,515,966 B1 | 2/2003 | Bardalai et al. | 370/236 |
| 6,519,254 B1 * | 2/2003 | Chuah et al. | 370/389 |
| 6,970,450 B1 * | 11/2005 | Scott | 370/352 |
| 2001/0025321 A1 * | 9/2001 | Tang et al. | 709/246 |
| 2002/0087699 A1 * | 7/2002 | Karagiannis et al. | 709/227 |
| 2004/0139088 A1 * | 7/2004 | Mandato et al. | 707/100 |
| 2004/0151206 A1 * | 8/2004 | Scholte | 370/473 |

FOREIGN PATENT DOCUMENTS

| | | |
|---|---|---|
| WO | WO 00/11849 | 3/2000 |
| WO | 02/13023 | 2/2002 |
| WO | WO 02/13023 | 2/2002 |

OTHER PUBLICATIONS

Second European Examination Report for European Patent Application No. 04250650.1 dated Dec. 8, 2004, pp. 1-8.
Canadian Examination Report for Canadian Patent Application No. 2,454,980, Mar. 3, 2005, pp. 1-3.

(Continued)

*Primary Examiner*—Glenton B. Burgess
*Assistant Examiner*—Philip S. Scuderi
(74) *Attorney, Agent, or Firm*—Sheridan Ross P.C.

(57) ABSTRACT

The present invention is directed to the discovery of network devices capable of handling multiplexed packet data flows. According to the present invention, multiplexing routers included in a path along which communication resources are reserved insert an object into the RSVP RESV message, to provide operating parameters to an originating multiplexing router. Using the operating parameters provided by multiplexing routers along the path, the originating multiplexing router can identify a multiplexing router proximate to a receiving communication device or devices. The originating multiplexing router can then create super packets addressed to the receiving multiplexing router proximate to the receiving communication that contains multiple data packets. The router to which the super packet is addressed can then deaggregate the super packet, and deliver the data packets to the receiving communication device or devices.

21 Claims, 2 Drawing Sheets

OTHER PUBLICATIONS

European Patent Office Communication attaching Search Report for European Patent Application No. 04250532.1 dated Oct. 4, 2004.

European Examination Report for European Patent Application No. 04250650.1 dated Dec. 8, 2004, pp. 1-6.

Thompson, Bruce et al., "Tunneling Multiplexed Compressed RTP ("TCRTP")," Internet Draft document of The Internet Engineering Task Force, Feb. 27, 2002, The Internet Society.

Thompson, Bruce et al., Tunneling Multiplexed Compressed RTP ("TCRTP"), Internet Draft document of The Internet Engineering Task Force, Jul. 19, 2001, available at http://www.ietf.org/proceedings/01aug/I-D/draft-ietf-avt-tcrtp-04.txt, The Internet Society.

Tanigawa, Keiko et al., "Simple RTP Multiplexing Transfer Methods for VOIP," Internet Draft document of The Internet Engineering Task Force, Nov. 18, 1998, available at http://www.ietf.org/proceedings/02mar/I-D/draft-ietf-avt-tcrtp-06.txt, The Internet Society.

Second European Examination Report for European Patent Application No. 04250650.1 dated Apr. 29,2005, pp. 1-7.

* cited by examiner

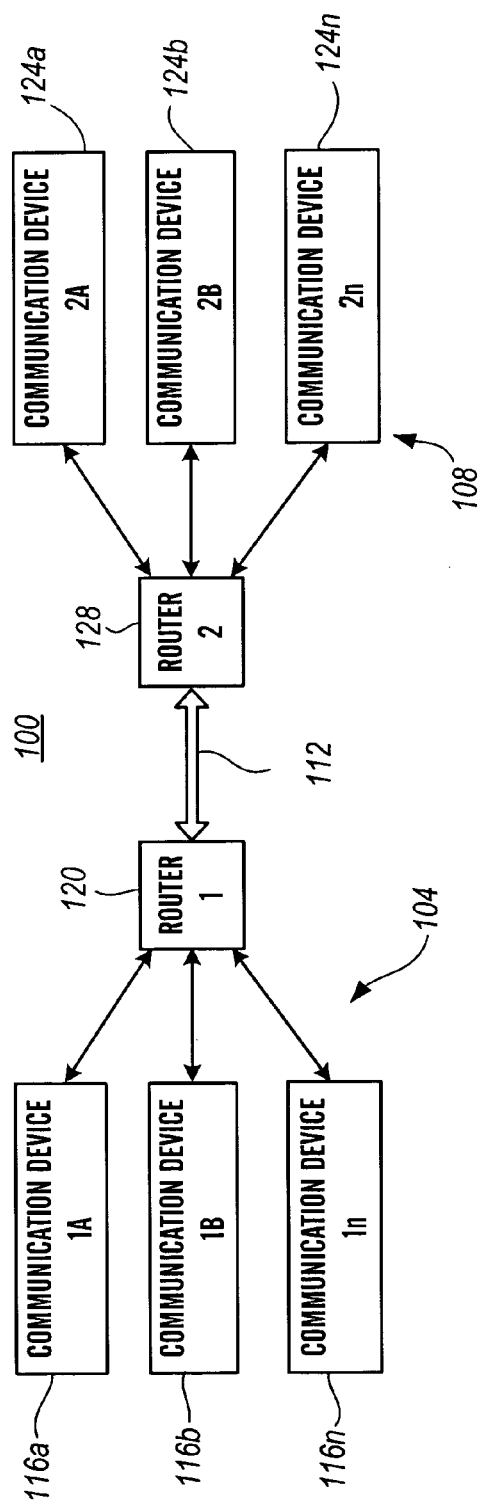
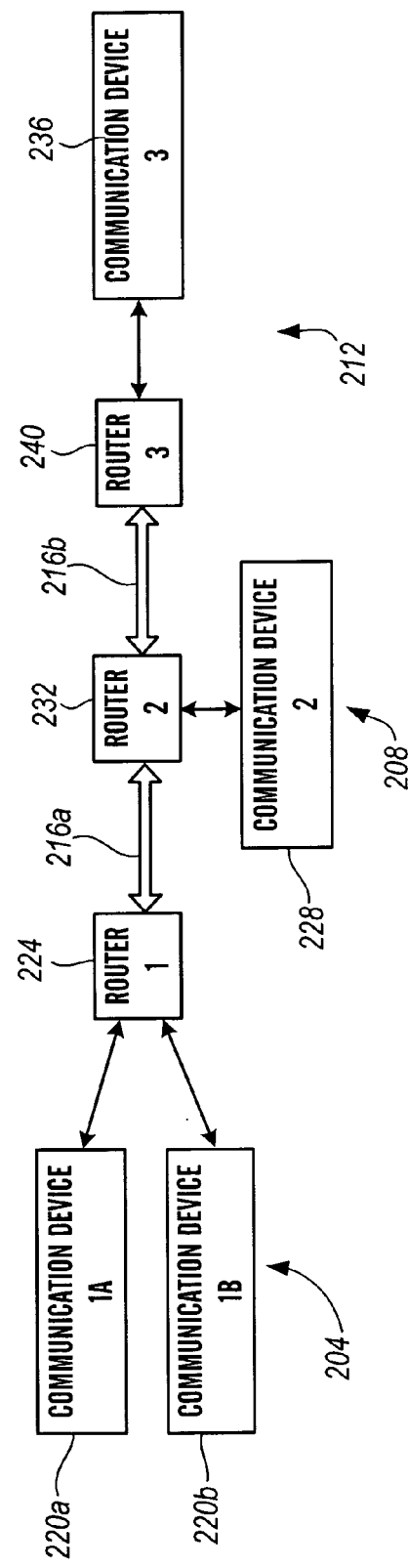

MULTIPLEXER DISCOVERY AND PARAMETER EXCHANGE

FIELD OF THE INVENTION

The present invention is directed to the process of multiplexer discovery and parameter exchange. In particular, the present invention provides for the discovery of multiplexers using a resource reservation protocol.

BACKGROUND OF THE INVENTION

The concept of multiplexing packet data flows, including real-time transport protocol (RTP) flows together into a single aggregate flow is a concept that is addressed in a number of Internet engineering task force (IETF) Internet drafts. Multiplexing RTP flows would be desirable, because it can reduce the bandwidth usage of wide area network (WAN) links and decrease the RTP packet rate incident on edge routers. In addition, the multiplexing of RTP flows reduces the burden of administering networks, for example in connection with the configuration of quality of service levels. In addition, multiplexing RTP flows can increase the scalability of existing quality of service schemes.

Although IETF Internet drafts specifying packet formats for aggregate flows, header compression algorithms, and packet loss compensation have been proposed, there are no methods for discovering the RTP multiplexing capabilities of a remote subnetwork. Discovery of such capabilities is desirable in order to determine whether packet data flows addressed to devices on a particular subnetwork are suitable for aggregation.

SUMMARY OF THE INVENTION

The present invention is directed to solving these and other problems and disadvantages of the prior art. Generally, according to the present invention, a resource reservation protocol (RSVP) object is defined for communicating the multiplexing capabilities of interconnected subnetworks. The RSVP object, referred to herein as a real-time transfer protocol multiplexing object (or RTPMULT) is inserted by a router with RTP multiplexing capabilities or by another network device that desires information regarding the multiplexing capabilities of network devices along a reserved communication path. The object includes communication parameters and other information. The RTPMULT object is inserted into an RSVP path message as part of the reservation of network resources for use in connection with an RTP communication.

As the RSVP path message is sent across the communication network, RTP multiplexing capable routers install the appropriate state information. In particular, upon decoding an RSVP path message containing the RTPMULT object, state information is installed. Upon reception of the corresponding RSVP reservation message in the reverse direction, a router supporting RTP multiplexing inserts an RTPMULT object that includes its operating parameters. Such operating parameters may include the Internet protocol (IP) address or port, the aggregate packet payload formats supported, and the maximum number of aggregate flows that the multiplexer can support. The use of the RSVP protocol to detect a remote multiplexer ensures that the path followed by an aggregated flow will definitely pass through the remote multiplexing device. Accordingly, the reliable deaggregation of multiplexed flows transmitted across an IP network can be assured.

BRIEF DESCRIPTION OF THE DRAWINGS

FIG. 1 is a block diagram depicting a communication system in accordance with an embodiment of the present invention;

FIG. 2 is a block diagram depicting a communication system in accordance with another embodiment of the present invention.

DETAILED DESCRIPTION

Figure 3:
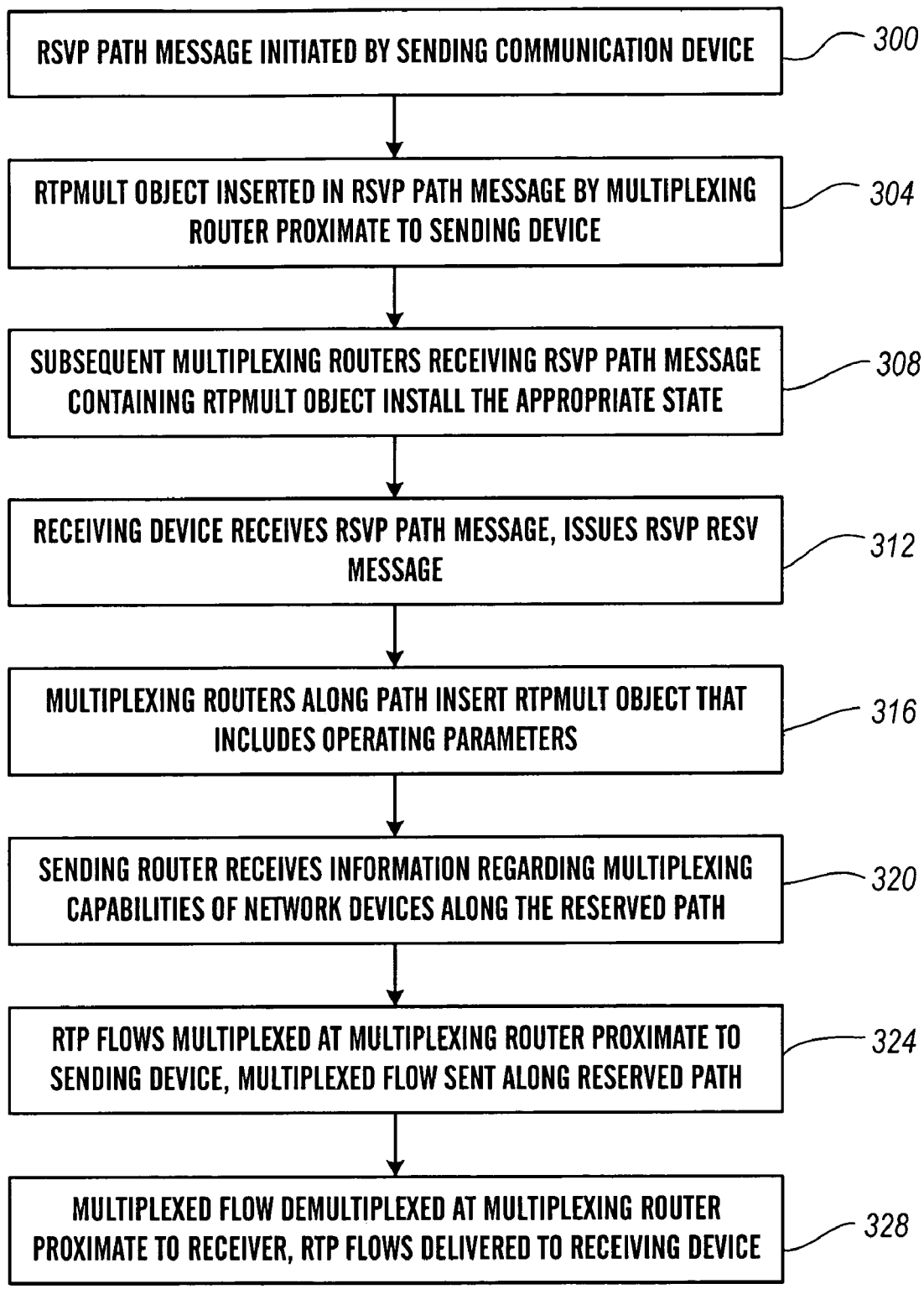
FIG. 3 is a flow chart illustrating the operation of a system in accordance with an embodiment of the present invention.

The present invention is directed to the discovery of network devices capable of multiplexing and demultiplexing aggregate data streams.

In FIG. 1, a communication system 100 in accordance with an embodiment of the present invention is illustrated. In general, the communication system 100 includes a first subnetwork 104 and a second or remote subnetwork 108. The first subnetwork 104 is interconnected to the second subnetwork 108 by a communication channel or network 112. The communication channel or network 112 may comprise a packet data network, and may include the Internet. An example of a communication network 112 is a wide area network (WAN).

The first subnetwork 104 generally includes one or more communication devices 116 that are each interconnected to a first multiplexing router 120. The communication devices 116 and first multiplexing router 120 are examples of network devices or nodes. As can be appreciated by one of skill in the art, the communication device or devices 116 may be interconnected to the first multiplexing router 120 by a dedicated communication channel or a network link. In accordance with an embodiment of the present invention, the first subnetwork 104 comprises a local area network (LAN), and may be implemented as an Ethernet network.

Like the first subnetwork 104, the second subnetwork 108 may include one or more communication devices 124 and a second multiplexing router 128. The communication devices 124 and the second multiplexing router are examples of network devices or nodes. The communication devices 124 may be interconnected to the router over dedicated communication links, or by a network. Accordingly, in accordance with an embodiment of the present invention, the second subnetwork 108 comprises a LAN and is implemented as an Ethernet network.

The communication devices 116, 124 associated with the system 100 may include any RSVP-enabled device suitable for sending and/or receiving packet data across a communication network. Accordingly, the communication devices 116, 124 may comprise IP telephones, general purpose computers, personal digital assistants (PDAs) or other computing devices configured to function in connection with voice or data communications. According to an embodiment of the present invention, the communication devices 116, 124 are configured to function in connection with real-time transfer protocol (RTP) communications, including voice over Internet protocols (VoIPs).

The multiplexing routers 120, 128 are RSVP-enabled, and generally function to route data across packet data communication network 112. In addition, the multiplexing routers 120, 128 generally function to aggregate individual data streams into bundled streams comprising super packets addressed to another multiplexing router 128 and containing data packets that may originate from one or more communication devices that are proximate to a particular multiplexing router 120 or 128. As used herein, a super packet is a data packet containing a number of individual data packets. A multiplexing router 120, 128 in accordance with an embodiment of the present invention is also capable of discovering the multiplexing capabilities of other routers 120, 128, and of communicating their own multiplexing capabilities to other routers 120, 128. Packet data streams from a communication device or devices 116 associated with the first subnetwork 104 may be aggregated into one or more super packets by the first multiplexing router 120. Similarly, communication devices 124 associated with the second subnetwork 108 may provide individual data packets as part of individual data streams that are aggregated into one or more super packets by the second multiplexing router 128. The super packets may then be sent from the multiplexing router 120, 128 across the communication network 112 to another multiplexing router. For example, packet data from one or more communication devices 116 may be aggregated into super packets by the first (or sending) multiplexing router 120 and sent across the communication network 112 to the second (or receiving) multiplexing router 128.

The multiplexing routers 120, 128 may also function to deaggregate super packets received from another multiplexing router. For example, the super packets received from the first multiplexing router 120 at the second multiplexing router 128 may be deaggregated, and the individual packets that comprised the super packet may be delivered to one or more communication devices 124 associated with the second subnetwork 104. Similarly, super packets received at the first multiplexing router 120, for example from the second multiplexing router 128, may be deaggregated and the individual data packets from individual data streams that comprise the super packet may be delivered to one or more communication devices 116 associated with the first subnetwork 104.

From the above description, it can be appreciated that the provision of a first multiplexing router 120 in association with a first subnetwork 104, and the provision of a second multiplexing router 128 in connection with a second subnetwork 108, can reduce the total number of packets that must be handled by the communication network 112 interconnecting the first 120 and second 128 multiplexing routers. This, in turn, can improve the performance of the communication network 112, and allow more data carried by the communication network 112 to benefit from the use of protected network resources.

With reference now to FIG. 2, a communication system 200 in accordance with another embodiment of the present invention is illustrated. In general, the communication system 200 may be considered as three interconnected subnetworks 204, 208 and 212. The subnetwork 204–212 may comprise LANs, and may be implemented as Ethernet networks. The subnetworks 204–212 are interconnected by a communication network 216.

The first subnetwork 204 may include one or more communication devices 220 and a multiplexing router 224. Similarly, the second subnetwork 208 may include one or more communication devices 228 and a multiplexing router 232, and the third subnetwork 212 may include one or more communication devices 236 and a multiplexing router 240. The various communication devices 220, 228, 236 and multiplexing routers 224, 232, 240 may be generally referred to herein as network devices or nodes. Like the communication devices 116, 124 described in connection with FIG. 1, the communication devices 220, 228 and 236 may comprise any device capable of sending packet data using the RSVP protocol across a communication network or subnetwork. Accordingly, the communication devices 220, 228 and 236 may comprise IP telephones, general purpose computers, PDAs or other computing devices configured to function in connection with voice communications.

The multiplexing routers 224, 232 and 240, like the routers 120 and 128 described in connection with FIG. 1, generally comprise RSVP-enabled packet data routers that are capable of aggregating individual data packets from one or more individual data streams into super packets containing a number of individual packets that are addressed to another multiplexing router 224, 232 or 240. In addition, the multiplexing routers 224, 232 and 240 are capable of deaggregating super packets and delivering the resulting unbundled individual data packets to receiving communication devices 220, 228 or 236. The multiplexing routers 224, 232 and 240 are also capable of discovering the multiplexing capabilities of one another, as will be described in greater detail below.

The communication network 216, shown as separate links 216*a* and 216*b* in FIG. 2, may comprise a packet data network, and may include the Internet or a private intranet. An example of the communication network 216 is a WAN.

As can be appreciated from FIG. 2, one or more communication devices 220 associated with the first subnetwork 204 may provide data packets to the multiplexing router 224 for transmission across the communication network 216. As can further be appreciated, a communication device 220 may request the reservation of network resources using the RSVP protocol in connection with the transmission of data packets. The multiplexing router 224 is capable of aggregating a number of individual data packets into a super packet. Furthermore, utilizing information received from other multiplexing routers (e.g., routers 232 and/or 240), the multiplexing router 224 associated with the first subnetwork 204 can address a super packet containing individual data packets associated with different data streams to a multiplexing router (e.g., multiplexing router 232) for deaggregation For example, a data packet transmitted as part of a super packet from the multiplexing router 224 associated with the first subnetwork 204 to the multiplexing router 232 associated with the second subnetwork 208 may be removed or unbundled from the aggregated packet at the multiplexing router 232 on the second subnetwork 208 for delivery to a communication device 228 on the second subnetwork 208. Furthermore, an aggregated or super data packet containing individual data packets addressed to a communication device 236 associated with the third subnetwork may be transmitted from a communication device 220 on the first subnetwork 204 through the multiplexing router 232 associated with the second subnetwork 208 and delivered to the multiplexing router 240 interconnected to the recipient communication device 236. The multiplexing router 240 associated with the third subnetwork 212 may then unbundle the received super packet and deliver the individual data packet to the recipient communication device 236.

As a further example, where data from a first communication device 220a on the first subnetwork 204 is provided for transmission to a communication device 236 on the third subnetwork 212, one or more individual data packets comprising such data may be aggregated into a super packet that also contains one or more data packets for delivery from a second communication device 220b on the first subnetwork 204 to a communication device 228 on the second subnetwork 208. In particular, the multiplexing router 232 associated with the second subnetwork 208 may unbundle the super packet or remove the individual data packet and deliver individual data packets addressed to the communication device 228 on the second subnetwork 208. Data packets for delivery to a communication device 236 on the third subnetwork 212 may then be rebundled into an aggregate packet, or simply sent on as the original data packet but with a payload that no longer includes data packets addressed to the communication device 228 on the second subnetwork 208, and delivered across the communication network 216b to the multiplexing router 240 associated with the third subnetwork 212. The super packet may then be unbundled and the remaining individual packets delivered to the communication device 236 on the third subnetwork 212.

As yet another example, data packets addressed to one or more communication devices 226 on the first subnetwork 204 may be aggregated by the multiplexing router 232 on the second subnetwork 208. For instance, one or more data packets from a communication device 228 on the second subnetwork may be aggregated by the multiplexing router 232 with one or more data packets from the communication device 236 on the third subnetwork 212.

With reference now to FIG. 3, the operation of a system 100, 200 in accordance with an embodiment of the present invention is illustrated. Initially, at step 300, an RSVP path message is initiated by a sending communication device (e.g., communication device 116 or 220). As can be appreciated by one of skill in the art, an RSVP path message may be generated in connection with a communication for which the reservation of communication network (e.g., communication network 112, 216) resources is desirable. An example of such a communication is a VoIP protocol voice telephony communication session.

The first multiplexing router to receive the RSVP path message (e.g., router 120, 224) inserts a real-time transport protocol multiplexing (RTPMULT) object into the RSVP path message (step 304). Subsequent multiplexing routers (e.g., router 128, 232, 240) that receive the RSVP path message containing the RTPMULT object install the appropriate state (step 308). In particular, each multiplexing router makes a soft reservation and establishes a record of the previous RSVP node (e.g., the previous communication device multiplexing router, router or other RSVP-enabled network node) in the communication path.

At step 312, the receiving device (e.g., communication device 124, 232) receives the RSVP path message, and issues an RSVP reservation (RESV) message. The multiplexing routers along the communication path insert an RTPMULT object into the RSVP RESV message as that message is received (step 316). The RTPMULT object may include the Internet protocol (IP) address or port, the aggregate payload formats supported, and the maximum number of aggregate flows for the particular multiplexing router 120, 128, 224, 232 or 240.

An example RSVP RTPMULT object specification is as follows:

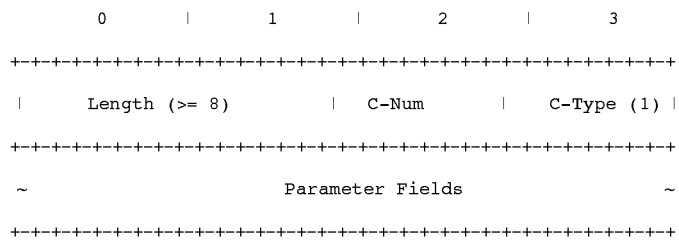

The first word contains the standard RSVP object header.
Length: Length of the object in bytes
C-Num: Object Class identifier. This is a unique number assigned to identify the RTPMULT Object class.
C-Type: Class Type Identifier. This field is always 1.

For the RTPMULT object placed in the RSVP Path message the following format may be used:

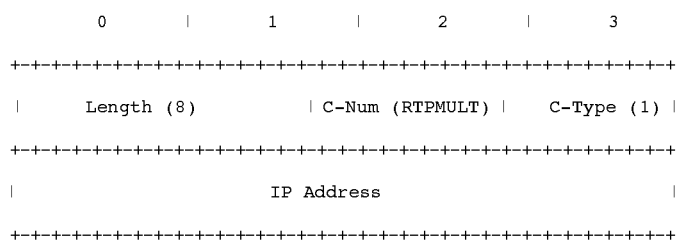

Where

IP Address: is the address of the multiplexer attempting to discover other multiplexers in the remote subnet.

For the RTPMULT object placed in the RSVP Resv messages the following format may be used:

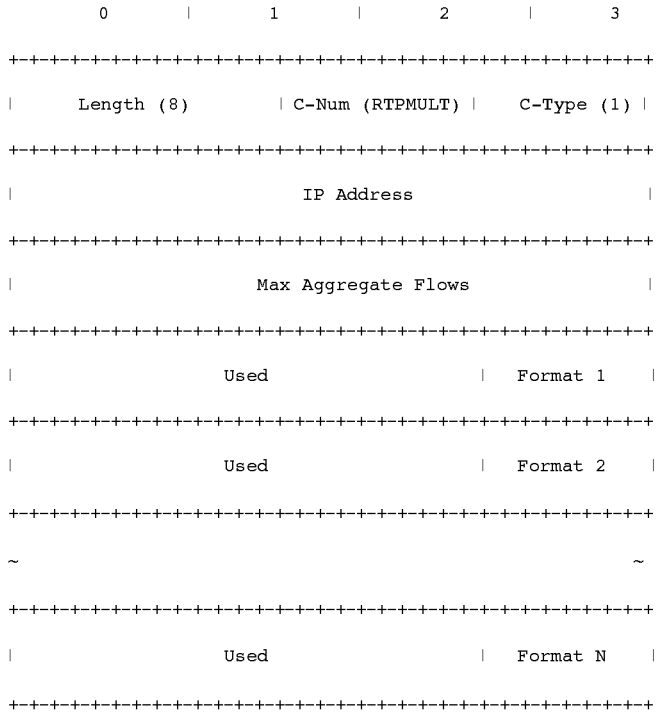

Where

IP Address: is the address of the multiplexer replying to the discovery attempt.

Max Aggregate Flows: is the maximum number of aggregate flows that are supported.

Format 1-N: List of Formats supported by the multiplexer. These are RTP Payload types for the aggregate packet formats.

At step 320, the multiplexing router proximate to the sending device receives the RSVP RESV message. From the RTPMULT objects inserted by each multiplexing router along the reserved path, the multiplexing router proximate to the sending device is informed of the multiplexing capabilities of network devices along that path.

Individual data packets associated with RTP flows received at the multiplexing router (e.g., multiplexing router 120 or 224) proximate to the sending communication device or devices (e.g., devices 116, 220) are placed into one or more super packets (step 324). The resulting super packet or packets are then sent along the reserved path as a multiplexed flow. The multiplexed flow is demultiplexed at the multiplexing router (e.g., multiplexing router 128 or 240) that is proximate to the receiving communication device (e.g., device 124 or 236), and the individual RTP flows are delivered to the receiving devices (step 328). As can be appreciated by one of skill in the art, the device or router that demultiplexes the super packet can be interconnected to the receiving devices by other network devices. For example, the multiplexing router may be interconnected to the receiving device or devices by a non-multiplexing capable router.

From the description set forth herein, it can be appreciated that the existence of multiplexing routers along a path that will be used to transmit data associated with a communication is communicated to other multiplexing routers when system 100, 200 resources are reserved as part of the establishment of an RSVP communication channel. The discovery of such resources (i.e., multiplexing routers) permits the aggregation of individual data packets associated with the communication or with other communications that will utilize all or a portion of the same path to be aggregated into super packets. The super packets thus formed may be deaggregated as necessary at multiplexing routers along the path of the super packet that are proximate to receiving communication devices. Accordingly, the number of individual resource reservations that must be established in connection with a number of individual data flows can be reduced.

As can also be appreciated from the description set forth herein, the present invention allows the existence of multiplexing routers to be determined, without requiring the maintenance of a map or table containing such information. Instead, information regarding relevant multiplexing routers may be obtained prior to the transmission of an aggregate flow that can make use of such information. Accordingly, the present invention is suitable for use in connection with communication systems that are very large. In addition, the present invention can readily adapt to changing resource availabilities.

Although the examples in the description set forth herein describe the network devices that are capable of inserting the RTPMULT object into an RSVP path message as multiplexing routers, the invention is not so limited. Rather, any network device that would like to discover multiplexing capable routers along the communication path may initiate the discovery process by inserting the RTPMULT object in a RSVP path message.

Furthermore, it should be appreciated that the multiplexing and demultiplexing of individual data packets or flows need not be performed by a multiplexing router. For example, a network device comprising a multiplexer may aggregate individual data streams and provide the resulting super packet to a router for delivery to a receiving device. Similarly, a super packet may be provided to a router for delivery to a recipient device or devices.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for discovering network devices capable of multiplexing packet data transmissions, comprising:
   receiving at a first network device an RSVP path message;
   inserting into said RSVP path message a first object, wherein said first object comprises a first real-time transport protocol multiplexing object for communicating the multiplexing capabilities of the first network device;
   receiving at a second network device said RSVP path message containing said first object;
   at least one of generating and receiving at said second network device an RSVP reservation message corresponding to said RSVP path message; and
   inserting a second object comprising at least a first operating parameter of said second network device in said RSVP reservation message and indicating that said second network device is capable of performing a multiplexing function.

2. The method of claim 1, further comprising:
   receiving at said first network device said RSVP reservation message containing said second object, wherein said first network device is provided with said at least a first operating parameter of said second network device.

3. The method of claim 1, wherein said first network device comprises a multiplexing router.

4. The method of claim 1, wherein said second network device comprises a multiplexing router.

5. The method of claim 1, wherein said at least a first operating parameter comprises at least one of an Internet protocol address and port.

6. The method of claim 1, wherein said at least a first operating parameter comprises an indication of at least a first aggregate payload format supported.

7. The method of claim 1, wherein said at least a first operating parameter comprises a maximum number of aggregate flows that can be handled.

8. The method of claim 1, wherein said RSVP message is received from a first communication device.

9. The method of claim 1, further comprising:
   receiving at a third network device said RSVP path message containing said first object;
   at least one of generating and receiving at said third network device an RSVP reservation message corresponding to said RSVP path message, wherein said second network device receives said RSVP reservation message; and
   inserting a third object comprising at least a first operating parameter of said third network device in said RSVP reservation message and indicating that said third network device is capable of performing a multiplexing function.

10. The method of claim 9, further comprising:
    receiving at said first network device said RSVP reservation message containing said second and third objects, wherein said first network device is provided with said at least a first operating parameter of said second network device and said at least a first operating parameter of said third network device.

11. The method of claim 1, further comprising:
    receiving at said first network device a plurality of data packets associated with said RSVP path and RSVP reservation messages and addressed to at least a first receiving communication device;
    aggregating said plurality of data packets into a super packet addressed to said second network device.

12. The method of claim 11, further comprising: deaggregating said super packet at said second network device.

13. The method of claim 12, further comprising: delivering said plurality of packets to at least a first receiving communication device.

14. A system, comprising:
    at least first communication device means for forming data packets and for marking said data packets with an RSVP path message;
    first network device means for inserting first information in said RSVP path message and for discovering the existence of multiplexing devices along a reserved communication path, wherein said first information comprises information related to the multiplexing capabilities of said first network device; and
    second network device means for inserting second information in an RSVP reservation message corresponding to said RSVP path message, wherein said second network device means are capable of performing data packet multiplexing functions, and wherein said second information comprises information related to the multiplexing capabilities of said second network device.

15. The system of claim 14, wherein said packet data multiplexing functions comprise packet data multiplexing and demultiplexing functions.

16. The system of claim 15, further comprising:
    At least second communication device means for receiving data delivered along said communication path.

17. A method for discovering network device capabilities, comprising:
    inserting at a first network device a first object in a path message, wherein said first object comprises first information related to multiplexing capabilities of said first network device;

sending said path message including said first object to a second network device;

receiving at said first network device second information related to multiplexing capabilities of said second network device included in a resource reservation message corresponding to said path message; and storing at least some of said first information in said first network device.

18. The method of claim 17, wherein said second network device comprises a multiplexing router.

19. The method of claim 17, wherein said first information stored in said first network device comprises address information related to said second network device.

20. The method of claim 17, further comprising:

addressing a super packet to said second network device, wherein said super packet contains data packets addressed to a communication device interconnected to said second network device.

21. The method of claim 17, wherein prior to receiving said first information said first network device does not have a record indicating that said second network device has multiplexing capabilities.

* * * * *